Sept. 19, 1939.  G. A. TINNERMAN  2,173,544
FASTENER
Filed July 17, 1936
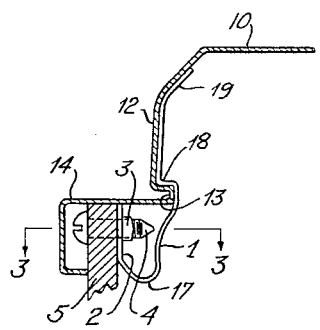
FIG. 1
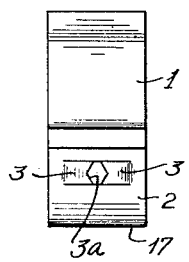
FIG. 2
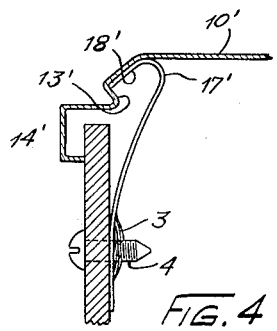
FIG. 4
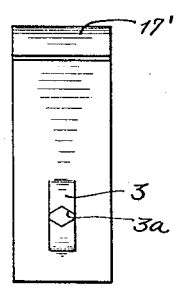
FIG. 5
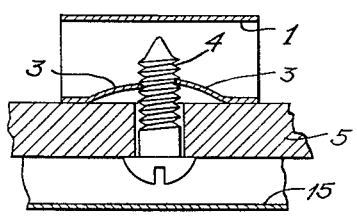
FIG. 3
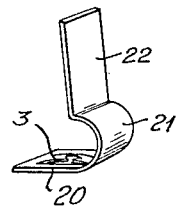
FIG. 6
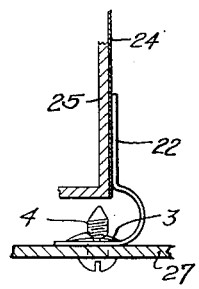
FIG. 7
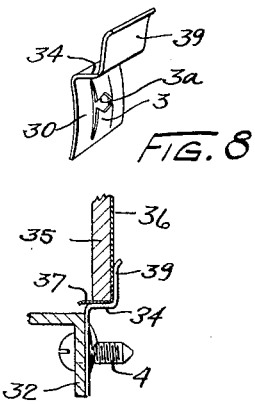
FIG. 8
FIG. 9
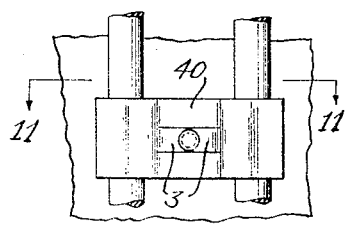
FIG. 10
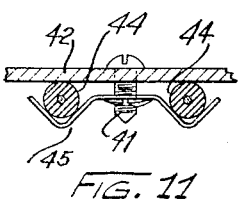
FIG. 11
INVENTOR.
George A. Tinnerman
BY Bates, Goldrick & Teare
ATTORNEYS.

Patented Sept. 19, 1939

2,173,544

UNITED STATES PATENT OFFICE 2,173,544

FASTENER

George A. Tinnerman, Rocky River, Ohio, assignor to Albert H. Tinnerman, Cleveland, Ohio Application July 17, 1936, Serial No. 91,171

8 Claims. (Cl. 189—88)

One object of the present invention is the provision of a simple, effective and quickly operable means for securing together parts of various structures.

A specific object is to provide a spring fastener, having means to engage and grip the threads of a stud or bolt, supported by one part of a structure, and additional spring means, operating independently of the thread-gripping spring means, to secure another part or other parts of the structure.

The principles hereof find practical application, for example, in refrigerator and other cabinet constructions, wherein parts such as covers and closure panels, have to be secured against accidental removal and against rattling, but which occasionally have to be removed to permit inspection of working parts normally concealed thereby. One problem is to render the securing means operative as a snap fastener, capable of some adjustment, and in any event attachable to the main structure in an inconspicuous position and as economically as possible. Similar problems arise in connection with securing lining material, such, for example, as metal foil (for thermal insulation e. g.) to the inside surfaces of cabinets, etc., wherein the securing means must not engage the foil with sufficient force to tear it, but nevertheless with sufficient force to hold it securely in place. Other problems solved by the application of the principles hereof include the attachment of tubes and rods, particularly those which may require some adjustment with reference either to the holding means or the supporting surface to which secured, and which must nevertheless be held snugly in place for long periods of time.

With the above in view, further specific objects of the invention include: the provision of a spring fastener, having means whereby the fastener itself may be attached very quickly to a bolt or stud, and means independent thereof for frictionally or yieldingly or interlockingly engaging an additional part to be secured to the main structure; the provision of an improved snap fastener for removable panels, etc.; the provision of a spring fastener adapted effectively to retain frangible web material, such as metal foil; and the provision of a spring fastener having special provision to retain cables, tubes, rods and the like in position on a main structure.

Other objects and features of the invention will become apparent from the following description, relating to the accompanying drawing, showing illustrative forms for meeting a few of the practical uses that have been suggested. The essential characteristics of the invention will be summarized in the claims.

In the drawing, Fig. 1 is a fragmentary sectional view through one corner of a cabinet structure and showing in side elevation one form of fastener, a plan view of which is shown in Fig. 2; Fig. 3 is a fragmentary detail sectional view, taken as indicated by the line 3—3 on Fig. 1; Fig. 4 is a fragmentary view, corresponding generally to Fig. 1, but showing different form of fastener, a plan view of which is shown in Fig. 5; Fig. 6 is a perspective view of another form of fastener; Fig. 7 is a fragmentary sectional view through a structure incorporating the fastener of Fig. 6; Fig. 8 is a perspective view of still another fastener, one use of which is illustrated in Fig. 9, a fragmentary sectional view similar to Fig. 7; Figs. 10 and 11 are plan and sectional views respectively of another form of fastener, particularly adapted for securing rods or tubes to a supporting base.

In the forms of the invention shown in Figs. 1 to 5, the spring fasteners act essentially as snap fasteners for securing panels, such as covers, to the main walls of a cabinet or the like. It will be assumed that the fastener in each form shown is made of sheet-metal spring stock or metal that has been suitably tempered.

In Figs. 1 and 2, a spring fastener is indicated at 1, as having a base portion 2 with horizontally extending spring tongues 3 outstruck therefrom, both of which may be suitably indented as at 3a, to engage the threads of a stud or bolt, an example of which latter is indicated at 4. The bolt, as shown, extends inwardly through a side wall member 5 of the cabinet; the head of the bolt lying outside of the cabinet wall near its upper margin. The shank of the bolt may have a pointed end facilitating engagement of the spring tongues 3 therewith, and tightening may be accomplished either by turning the screw when the tongues are engaged with the threads, or by pushing the tongues down across the threads to seat the base 2 of the fastener (e. g.) in face-to-face contact with the wall 5. A plurality of such fasteners are usually present, although only one is shown.

An arm portion of each fastener, having its own spring effect, extends from the base 2 outwardly from the margin of the wall 5 in position to engage a cover device 10 on its inside. As shown, the cover has a side wall 12 with a rib 13 extending inwardly to form an inside overhanging shoulder, and below the rib 13 the cover is flanged outwardly, as at 14, to form a hollow external rib, housing the bolt heads. The cover-securing arm begins with an open loop 17, and above this is a shoulder effect 18, which engages the rib 13 of the cover. The arm is then continued upwardly on substantially the same contour as the inside of the wall 12, but the extremity 19 is bent inwardly, principally to form a cam by which the whole upper portion of the arm is sprung inwardly by engagement with the rib 13, when the cover is placed over the top of the cabinet. When the rib 13 passes the shoulder 18 on the fastener, the shoulder snaps into place to latch the cover snugly in place. The latching shoulder 18 may, of course, be inclined with reference to the top surface of the rib 13 to facilitate detachment of the cover by straight upward movement of it.

In the form shown in Figs. 4 and 5, the outstruck tongues 3 are arranged vertically instead of horizontally and instead of a loop which provides initial spring effect for the latching arm being disposed adjacent the thread-gripping portion of the fastener, a loop is provided nearer the outer end of the arm, as at 17', and the extremity of a downwardly extending portion 18' of the spring arm engages directly a shoulder effect 13' formed by an inwardly extending rib on the cabinet top 10'. The outer hollow rib 14' on the cover may extend down to conceal the bolt heads, but these, being very small and inconspicuous, may be left exposed as illustrated, in which event the bolt heads are accessible to permit loosening of the fasteners when the cover is to be removed.

Referring now to the form shown in Figs. 6 and 7, this form comprises a base 20, having spring tongues 3 thereon of suitable design, the base being looped upwardly as at 21 and having a flat spring portion 22 adapted to engage say a foil lining 24, for a wall member, part of which is shown at 25, to hold the foil in place. No snap or interlocking latching action is indicated in this form, it being apparent that the spring pressure necessary to hold the foil is brought into operation when the spring tongues 3 are associated with the threads of the bolt 4, the latter extending upwardly through a wall member, a portion of which is shown at 27.

A construction similar to that just described, is shown in Figs. 8 and 9, wherein spring tongues 3 are formed on an arched base 30, adapted to lie against a support, such as 32, for the bolt. A shoulder is provided, as at 34, on which the wall member 35 may rest, said wall member 35 having a lining, as of metal foil 36, which, as shown, extends under the bottom edge of the wall 35, as at 37. The spring arm effect and shoulder 34—39 hold the foil both by engaging it on the inside of the wall member 35, and at the underlapping margin.

In all of the above described forms, it will be apparent that the spring effect of the extension of the fasteners beyond the bolt thread-gripping means is employed, either by interlocking engagement with a part to be secured, or by direct pressure thereagainst, to hold the additional part or parts in the manner found most suitable to each individual case.

As a further illustration of the principles hereof, Figs. 10 and 11 show a fastener comprising a sheet-metal body 40 having spring tongues 3 thereon adapted to engage and grip the threads of the bolt 41, extending through a supporting plate 42. In this case it is desired to hold, for example, a pair of tubes or cables 44, in parallel relationship against the support 42, in such manner that rattling will be prevented, and nevertheless some relative adjustment of either of the members 44 permitted in making connections. As shown, V-shaped loops 45 are formed near the end portions of the body 40 and spring-arm effects between the bolt-gripping portions of the body and the V-loops act in addition to the spring effect of the tongues on the bolt threads, yieldingly to retain the parts 44 in place. There may, of course, be one or more of such loops 45 on each fastener, and the spring pressure is brought into operation on the parts secured when the bolt-gripping tongues, or their equivalent, are in predetermined relationship to the threads of the bolt, as is true of all the illustrated forms.

I claim:

1. In an assembly of the class described, a connecting device complete in itself and securing a threaded shank element or the like to a supporting surface, comprising, a section of sheet material having a thickness relatively thin with respect to the cross-section of said threaded shank element, said section comprising a body portion having an arm integral therewith and yieldable with respect thereto, said body portion being provided with integral means deformed therefrom and adapted to receive said threaded shank element for securing said body to said supporting surface, said integral means of the body cooperating with said relatively yieldable arm for resiliency in the assembly, said arm securing an object to, or a part cooperating with, said supporting surface.

2. In an assembly of the class described, a connecting device complete in itself comprising, a body portion, an arm integral with said body portion and yieldable with respect thereto, said body portion being provided with integral, yieldable means deformed therefrom and adapted to receive a stud member for securing said body to a supporting surface, said integral, yieldable means of the body cooperating with said relatively yieldable arm for resiliency in the assembly, said arm securing an object or cooperating part with respect to said supporting surface.

3. In an assembly of the class described, a connecting device complete in itself comprising a body portion, an arm integral with said body portion and relatively yieldable thereto, said arm including a looped portion to increase the resiliency thereof, said body portion being provided with integral means deformed therefrom and adapted to receive a stud member for securing said body portion to a supporting surface, said integral means of the body cooperating with said relatively yieldable arm for resiliency in the assembly, said arm securing an object or a part cooperating with said supporting surface.

4. In a structure of the class described, a connecting device complete in itself comprising, a body portion, an arm integral with said body portion and yieldable with respect thereto, said arm including a latching shoulder and said body portion being provided with integral means deformed therefrom and adapted to receive a stud member for securing said body portion to a supporting surface, said integral means of the body cooperating with said yieldable arm to provide a resilient mounting for said latching shoulder whereby the same may yieldingly engage and retain in assembled relation a cooperating part of the structure.

5. In a structure of the class described, a connecting device complete in itself comprising, a body portion, an arm integral with said body portion and yieldable with respect thereto, said arm including a looped portion to increase the resiliency thereof, said body portion being provided with integral means deformed therefrom and adapted to coengage with a stud member for securing said body portion to a supporting surface, said integral means of the body being adapted to cooperate with said relatively yieldable arm for resiliency, said arm securing an object to, or a part cooperating with said supporting surface and being adapted to compensate for strains set up in the assembly or incident to use of the structure.

6. In a structure of the class described, a connecting device complete in itself comprising, a body portion, an arm integral with said body portion and yieldable with respect thereto, said arm including a latching shoulder and said body portion being provided with integral means deformed therefrom and adapted to coengage with a stud member for securing said body portion to a supporting surface, said integral means of the body portion cooperating with said relatively yieldable arm to provide a resilient mounting for said latching arm whereby the same may yieldingly engage and retain a cooperating part with respect to said supporting surface and also compensate for strains set up in assembly or incident to use of the structure.

7. In a structure of the class described, a connecting device complete in itself comprising, a body portion, an arm integral with said body portion and yieldable with respect thereto, said arm including a latching shoulder of specific configuration deformed therefrom, said body portion being provided with integral means deformed therefrom adapted to coengage with a stud member for securing said body portion to a supporting surface, said integral means of the body being adapted to cooperate with said relatively yieldable arm to provide a resilient mounting for said latching shoulder, whereby said latching shoulder is adapted to function as a snap stud fastener for securing a complementary shouldered part with respect to said supporting surface.

8. In a structure such as described, the combination of cooperating panels and a connecting device for yieldably retaining said panels in assembled relation, said connecting device being complete in itself and comprising a body portion, an arm integral with said body portion and yieldable with respect thereto, said arm being deformed to provide a latching shoulder, and said body portion being provided with integral means deformed therefrom adapted to coengage with a stud member for securing the connecting device to one of said panels, said integral means of the body portion cooperating with said relatively yieldable arm to provide a resilient mounting for said latching arm whereby the same may yieldingly engage a complementary shoulder on a cooperating panel to maintain the panels in assembled relation and to compensate for strains set up in assembly or incident to use of the structure.

GEORGE A. TINNERMAN.